US012483382B2

(12) United States Patent
Mukherjee et al.

(10) Patent No.: US 12,483,382 B2
(45) Date of Patent: Nov. 25, 2025

(54) APPARATUS AND METHOD WITH HOMOMORPHIC ENCRYPTION

(71) Applicants: Samsung Electronics Co., Ltd., Suwon-si (KR); Graz University of Technology, Graz (AT)

(72) Inventors: Anisha Mukherjee, Graz (AT); Aikata Aikata, Graz (AT); Ahmet Can Mert, Graz (AT); Yongwoo Lee, Suwon-si (KR); Sunmin Kwon, Suwon-si (KR); Maksim Deriabin, Suwon-si (KR); Sujoy Sinha Roy, Graz (AT)

(73) Assignees: Samsung Electronics Co., Ltd., Suwon-si (KR); Graz University of Technology, Graz (AT)

( * ) Notice: Subject to any disclaimer, the term of this patent is extended or adjusted under 35 U.S.C. 154(b) by 160 days.

(21) Appl. No.: 18/396,380

(22) Filed: Dec. 26, 2023

(65) Prior Publication Data
US 2024/0348421 A1    Oct. 17, 2024

(30) Foreign Application Priority Data

Apr. 11, 2023 (KR) .................. 10-2023-0047233
Jul. 31, 2023 (KR) .................. 10-2023-0099974

(51) Int. Cl.
*H04L 9/00* (2022.01)
*G06F 9/48* (2006.01)
*H04L 9/06* (2006.01)

(52) U.S. Cl.
CPC ............ *H04L 9/008* (2013.01); *G06F 9/4881* (2013.01); *H04L 9/0618* (2013.01)

(58) Field of Classification Search
CPC ......... H04L 9/008; H04L 9/0618; H04L 9/00; G06F 9/4881; G06F 9/5066; G06F 9/544
See application file for complete search history.

(56) References Cited

U.S. PATENT DOCUMENTS

| 11,416,638 | B2 | 8/2022 | Banerjee et al. |
| 11,569,994 | B2 | 1/2023 | Ghosh et al. |
| 2022/0188072 | A1* | 6/2022 | Langhammer .......... G06F 7/722 |
| 2023/0027423 | A1 | 1/2023 | Rao |

(Continued)

FOREIGN PATENT DOCUMENTS

| KR | 10-1861089 B1 | 5/2018 |
| KR | 10-2462395 B1 | 11/2022 |

OTHER PUBLICATIONS

Fan et al. "Somewhat Practical Fully Homomorphic Encryption" *Cryptology ePrint Archive*, 2012 (pp. 1-19).

(Continued)

*Primary Examiner* — Quazi Farooqui
(74) *Attorney, Agent, or Firm* — NSIP Law

(57) ABSTRACT

An apparatus includes: one or more memories configured to store an operation key comprising a re-linearization key and ciphertext comprising a plurality of modules; a controller configured to schedule a homomorphic encryption operation based on the ciphertext, based on at least one of the plurality of modules and a modulus of the ciphertext; and a plurality of operation devices configured to parallelly process respective parts of the homomorphic encryption operation according to a result of the scheduling.

20 Claims, 11 Drawing Sheets

(56) References Cited

U.S. PATENT DOCUMENTS

| | | | |
|---|---|---|---|
| 2023/0132500 A1 | 5/2023 | Roy et al. | |
| 2023/0188320 A1* | 6/2023 | Park | H04L 9/0618 380/28 |

OTHER PUBLICATIONS

Brakerski et al. "(Leveled) Fully Homomorphic Encryption without Bootstrapping" *ACM Transactions on Computation Theory (TOCT)* vol. 6 No. 3, 2014 (pp. 1-27).

Pedrouzo-Ulloa et al. "Multivariate Lattices for Encrypted Image Processing" *2015 IEEE International Conference on Acoustics, Speech and Signal Processing (ICASSP)*. IEEE, 2015 (pp. 1-5).

Cheon et al. "Homomorphic Encryption for Arithmetic of Approximate Numbers" *Advances in Cryptology—AsiaCrypt 2017: 23rd International Conference on the Theory and Applications of Cryptology and Information Security*, Hong Kong, China, Dec. 3-7, 2017, Proceedings, Part I 23. Springer International Publishing, 2017 (pp. 1-23).

Cheon et al. "Multi-dimensional Packing for HEAAN for Approximate Matrix Arithmetics" *Cryptology ePrint Archive*, 2018 (pp. 1-29).

Bos et al. "Crystals—Kyber: a CCA-secure module-lattice-based KEM" *018 IEEE European Symposium on Security and Privacy (EuroS&P)*. IEEE, 2018 (pp. 1-15).

D'Anvers et al. "Saber: Module-LWR based key exchange, CPA-secure encryption and CCA-secure KEM" *Progress in Cryptology—AfricaCrypt 2018: 10th International Conference on Cryptology in Africa*, Marrakesh, Morocco, May 7-9, 2018, Proceedings 10. Springer International Publishing, 2018 (pp. 1-24).

Cheon et al. "A Full RNS Variant of Approximate Homomorphic Encryption" *Selected Areas in Cryptography—SAC 2018: 25th International Conference*, Calgary, AB, Canada, Aug. 15-17, 2018, Revised Selected Papers 25. Springer International Publishing, Jan. 13, 2019 (pp. 347-368).

Agrawal et al. "FAB: An FPGA-based Accelerator for Bootstrappable Fully Homomorphic Encryption" arXiv preprint arXiv:2207.11872v1, Jul. 25, 2022 (pp. 1-14).

Mert et al. "Medha: Microcoded Hardware Accelerator for computing on Encrypted Data" arXiv preprint arXiv:2210.05476, Oct. 12, 2022 (pp. 1-38).

* cited by examiner

APPARATUS AND METHOD WITH HOMOMORPHIC ENCRYPTION

CROSS-REFERENCE TO RELATED APPLICATIONS

This application claims the benefit under 35 USC § 119(a) of Korean Patent Application No. 10-2023-0047233, filed on Apr. 11, 2023, and Korean Patent Application No. 10-2023-0099974, filed on Jul. 31, 2023, in the Korean Intellectual Property Office, the entire disclosures of which are incorporated herein by reference for all purposes.

BACKGROUND

1. Field

The following description relates to an apparatus and method with homomorphic encryption operation.

2. Description of Related Art

Homomorphic encryption is a promising encryption method that enables arbitrary operations between encrypted data. The use of homomorphic encryption enables arbitrary operations on encrypted data without decrypting the encrypted data, and homomorphic encryption may be lattice-based, and thus may be safe and resistant to quantum algorithms.

Parameters of lattice-based homomorphic encryption may include a coefficient modulus q and a degree N of polynomial corresponding to ciphertext. The parameters may be determined based on targeted bit security and a multiplicative depth. Accordingly, it is advantageous to support various degrees of polynomial and moduli to design a flexible accelerator, that is, an accelerator applicable to various applications.

One of the most important parameters of homomorphic encryption is the degree N of polynomials. CKKS (Cheon, Kim, Kim, and Song), BGV (Brakerski, Gentry, and Vaikuntanathan, and BFV (Brakerski, Fan, and Vercauteren) use a large parameter of $N>=2^{14}$, and FHEW (Fastest Homomorphic Encryption in the West) and TFHE (Fast Fully Homomorphic Encryption over the Torus) use a small parameter of $N<2^{11}$.

Although the operable number (level) of multiplications increases as a parameter increases, the amount of data to be processed en bloc may also increase. Thus, a hardware accelerator having a resource limit may not use a large degree.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, an apparatus includes: one or more memories configured to store an operation key comprising a re-linearization key and ciphertext comprising a plurality of modules; a controller configured to schedule a homomorphic encryption operation based on the ciphertext, based on at least one of the plurality of modules and a modulus of the ciphertext; and a plurality of operation devices configured to parallelly process respective parts of the homomorphic encryption operation according to a result of the scheduling.

For the parallelly processing, the plurality of operation devices may be configured to parallelly process a re-linearization operation using the re-linearization key.

For the scheduling, the controller may be configured to schedule the homomorphic encryption operation based on the modulus of the ciphertext.

For the parallelly processing, the plurality of operation devices may be configured to parallelly process the homomorphic encryption operation according to the modulus of the ciphertext.

For the parallelly processing, the plurality of operation devices may be configured to perform a multiplication operation based on the ciphertext without communicating with one another.

For the scheduling, the controller may be configured to schedule the homomorphic encryption operation based on a number of the plurality of modules comprised in the ciphertext.

For the parallelly processing, the plurality of operation devices may be configured to parallelly process the homomorphic encryption operation according to the plurality of modules comprised in the ciphertext.

The plurality of operation devices may be configured to share the one or more memories.

The one or more memories may include a plurality of memories configured to store ciphertext performable in each of a plurality of accelerator memories.

The apparatus may include a bus configured to perform data transmission between the plurality of memories.

In one or more general aspects, a processor-implemented method includes: receiving an operation key comprising a re-linearization key and ciphertext comprising a plurality of modules; scheduling a homomorphic encryption operation based on the ciphertext, based on a modulus of the ciphertext and one or more of the plurality of modules; and parallelly processing at least part of the homomorphic encryption operation according to a scheduling result by using a plurality of operation devices.

The parallelly processing may include parallelly processing a re-linearization operation using the re-linearization key.

The scheduling may include scheduling the homomorphic encryption operation based on the modulus of the ciphertext.

The parallelly processing further may include parallelly processing the homomorphic encryption operation according to the modulus of the ciphertext.

The parallelly processing further may include performing a multiplication operation based on the ciphertext without communicating with one another.

The scheduling further may include scheduling the homomorphic encryption operation based on the plurality of modules comprised in the ciphertext.

The parallelly processing further may include parallelly processing the homomorphic encryption operation according to the plurality of modules comprised in the ciphertext.

In one or more general aspects, a non-transitory computer-readable storage medium stores instructions that, when executed by a processor, configure the processor to perform any one, any combination, or all of operations and/or methods described herein.

In one or more general aspects, an apparatus includes: one or more memories configured to store an operation key comprising a re-linearization key and ciphertext comprising a plurality of modules; a controller configured to schedule a homomorphic encryption operation for the ciphertext, based on a number of the plurality of modules comprised in the ciphertext; and a plurality of operation devices configured to parallelly process respective parts of the homomorphic encryption operation according to a result of the scheduling.

The one or more memories may include a plurality of memories, each corresponding to a respective one of the operation devices, and an operation device among the operation devices may be configured to receive data from a memory of the memories corresponding to another operation device among the operation devices, and perform a respective part of the homomorphic encryption operation based on the received data.

Other features and aspects will be apparent from the following detailed description, the drawings, and the claims.

Figure 1:
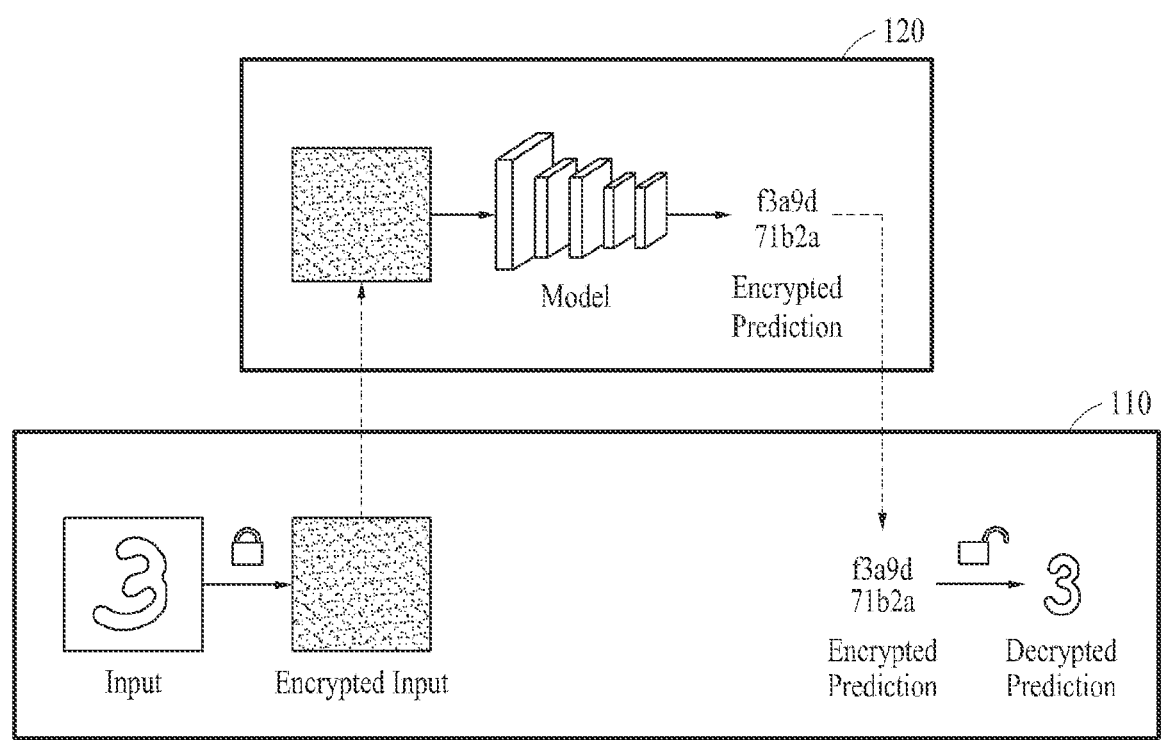
FIG. 1 illustrates an example of a homomorphic encryption operation system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. It will be further understood that terms, such as those defined in commonly used dictionaries, should be interpreted as having a meaning that is consistent with their meaning in the context of the relevant art and the disclosure of the present application, and will not be interpreted in an idealized or overly formal sense unless expressly so defined herein.

When describing the embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as "connected to," "coupled to," or "joined to" another component or element, it may be directly (e.g., in contact with the other component or element) "connected to," "coupled to," or "joined to" the other component or element, or there may reasonably be one or more other components or elements intervening therebetween. When a component or element is described as "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

The same name may be used to describe an element included in the embodiments described above and an element having a common function. Unless otherwise mentioned, the descriptions on the embodiments may be applicable to the following embodiments, and thus duplicated descriptions will be omitted for conciseness.

The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example of a homomorphic encryption operation system.

Referring to FIG. 1, a homomorphic encryption operation system 100 of one or more embodiments may include a client 110 and a server 120 as main components.

The homomorphic encryption operation system 100 may be a system for performing encryption and decryption by using homomorphic encryption, in which homomorphic encryption refers to an encryption method of performing various operations while data is encrypted. In homomorphic encryption, the result of an operation using ciphertext may become new ciphertext, and plaintext obtained by decrypting the ciphertext may be the same as an operation result of the original data before the encryption.

For example, the client 110 may generate ciphertext ct(m) by encrypting a message m and may transmit the ciphertext ct(m) to the server 120. The server 120 may perform various operations in an encrypted state by using a homomorphic encryption operation apparatus and may transmit an operation result ct(f(m)) again to the client 110. The client 110 may perform decryption on the operation result ct(f(m)), and plaintext f(m) obtained by decrypting the ciphertext ct(m) may be the same as an operation result of the original data (e.g., the message m) before the encryption.

Hereinafter, encrypted data or encrypted text may be referred to as ciphertext. The ciphertext may be in the form of a polynomial or a vector including a polynomial.

The homomorphic encryption operation system 100 may be implemented in an encryption process of encrypting an input value in all devices and services that apply homomorphic encryption. The client 110 may be implemented in a personal computer (PC) or a portable device, which is a device for performing key generation, encryption, and decryption.

The portable device may be implemented as, for example, a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal or portable navigation device (PND), a handheld game console, an e-book, and/or a smart device. The smart device may be implemented as, for example, a smartwatch, a smart band, and/or a smart ring.

The homomorphic encryption operation apparatus for performing operations, such as the addition and multiplication between pieces of encrypted data, may be implemented in the server 120. The homomorphic encryption operation apparatus may perform a module learning with errors (MLWE) problem-based homomorphic encryption operation that supports an operation on ciphertext into which plaintext including a binary number is encrypted. The homomorphic encryption operation apparatus may perform an MLWE problem-based homomorphic encryption operation that supports an operation on ciphertext into which plaintext including an integer is encrypted. The homomorphic encryption operation apparatus may perform an MLWE problem-based approximate homomorphic encryption operation that supports an operation on ciphertext into which plaintext including a real number and/or a complex number is encrypted. An example of the MLWE problem-based homomorphic encryption operation is described in detail below with reference to FIGS. 2 to 3B.

The homomorphic encryption operation apparatus may derive the same result as a result obtained from an operation on data in a plaintext state by decrypting a result obtained from an operation on data in an encrypted state by using homomorphic encryption.

The homomorphic encryption operation apparatus may perform a homomorphic operation on the ciphertext of plaintext encoded in various forms.

The homomorphic encryption operation apparatus may be implemented in the form of a chip and mounted on a hardware accelerator using homomorphic encryption. The homomorphic encryption operation apparatus may be implemented in the form of a chip to reduce the memory usage of various operation apparatuses. The homomorphic encryption operation apparatus of one or more embodiments may reduce the amount of computation for a homomorphic encryption operation, thereby reducing the overall amount of computation of the server.

The homomorphic encryption operation apparatus may be applied to all MLWE problem-based homomorphic encryption and may be implemented in an encryption process for encrypting an input value in all devices and services to which homomorphic encryption is applied.

Figure 2:
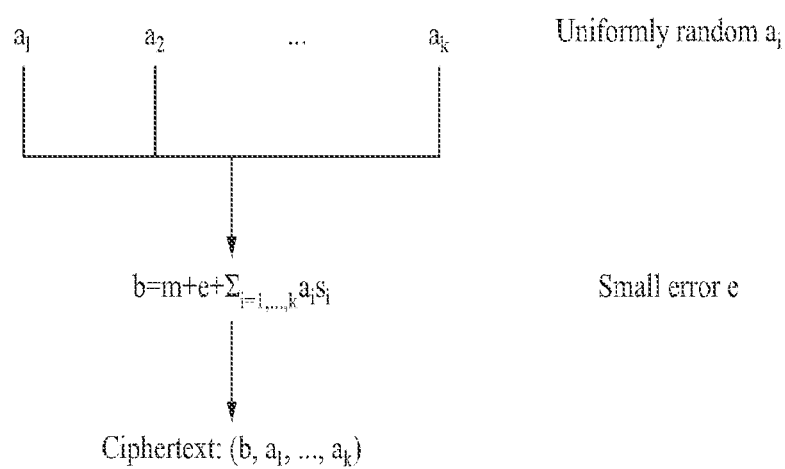
FIG. 2 illustrates an example of a ciphertext generation method.

FIG. 2 illustrates an example of a ciphertext generation method.

Referring to FIG. 2, a client (e.g., the client 110 of FIG. 1) may generate ciphertext including a plurality of modules. Accordingly, a parameter may be set according to the number of homomorphic operations to be performed (hereinafter, referred to as a homomorphic operation level).

For example, the client may encode a message z ($z \in C^l$, l|N, $$\ell \le \frac{N}{2},$$

here, C denotes a complex number domain) to be encrypted according to Equation 1 below, for example.

$$m = \text{Round}(\Delta Emb(z)), m \in R_q \qquad \text{Equation 1}$$

Encoding may be a process of mapping a message of the complex number domain to a polynomial. Encoding may be a reverse operation of canonical embedding. $Emb(m)_i = m(\zeta^i)$, here, $\zeta$ may be a root of unity of 1, and a round operation may be an operation of rounding off to the nearest element of R_q. $\Delta$ may be a large integer, which may be referred to as a scaling factor. However, encoding methods are not limited to the foregoing examples. For example, although the examples of encoding a message in a complex number form are provided above, a message form may be a real number.

The client may encrypt an encoded message m and may generate ciphertext (b, $a_1, \ldots, a_k) \in R_q^{k+1}$ according to Equation 2 below, for example.

$$b = m + e - \Sigma a_i s_i \qquad \text{Equation 2}$$

In this case, a module $a_i$ of ciphertext may be randomly generated in an N−1-degree polynomial form, and $s_1, \ldots, s_k$ may be a secret key, which may also be in the N−1-degree polynomial form.

The operable number of levels in ring learning with errors (RLWE) problem-based homomorphic encryption may only be determined based on a modulus Q of ciphertext. In the RLWE problem-based homomorphic encryption, a polynomial degree N may be in the form of a power of 2, and log Q may be proportional to the polynomial degree N. Accordingly, the RLWE problem-based homomorphic encryption may cause inefficiency that Q must be increased to increase the number of homomorphic operations, and N is forced to be at least doubled to increase Q. Accordingly, there may be a problem of inefficiency that number theoretic transform (NTT) should be performed on a polynomial having a large degree when designing a hardware accelerator or the like.

Unlike the RLWE problem-based homomorphic encryption, in MLWE problem-based homomorphic encryption, a parameter may not be determined based on the polynomial degree N, and rather a small positive integer k (k may refer to the number of modules) may be adopted, (N,k) may become a main parameter, and (N,k,Q) may be determined based on the homomorphic operation level and safety.

In other words, since the operable number of levels may be determined based on the modulus Q, and Q may be determined based on a combination of N and k, the homomorphic encryption operation apparatus of one or more embodiments may increase the flexibility of parameter selection and hardware design by decreasing the size of N compared to the RLWE problem-based homomorphic encryption. For example, since log Q should only be proportional to the total length of k N−1-degree polynomials, a change of the total size of ciphertext according to Q may not be great. In addition, since the modulus Q may be determined based on the combination of N and k, a Q value may be minutely set.

The client may transmit the ciphertext to a server (e.g., the server 120 of FIG. 1), and the server may perform various operations in an encrypted state. The client may decrypt the ciphertext again according to Equation 3 below, for example.

$$m \approx b + \Sigma a_i s_i \quad \text{Equation 3}$$

Then, the client may obtain plaintext that is the same as an operation result of the original data before the encryption by performing decoding, which is a reverse operation of encoding.

Figure 3A:
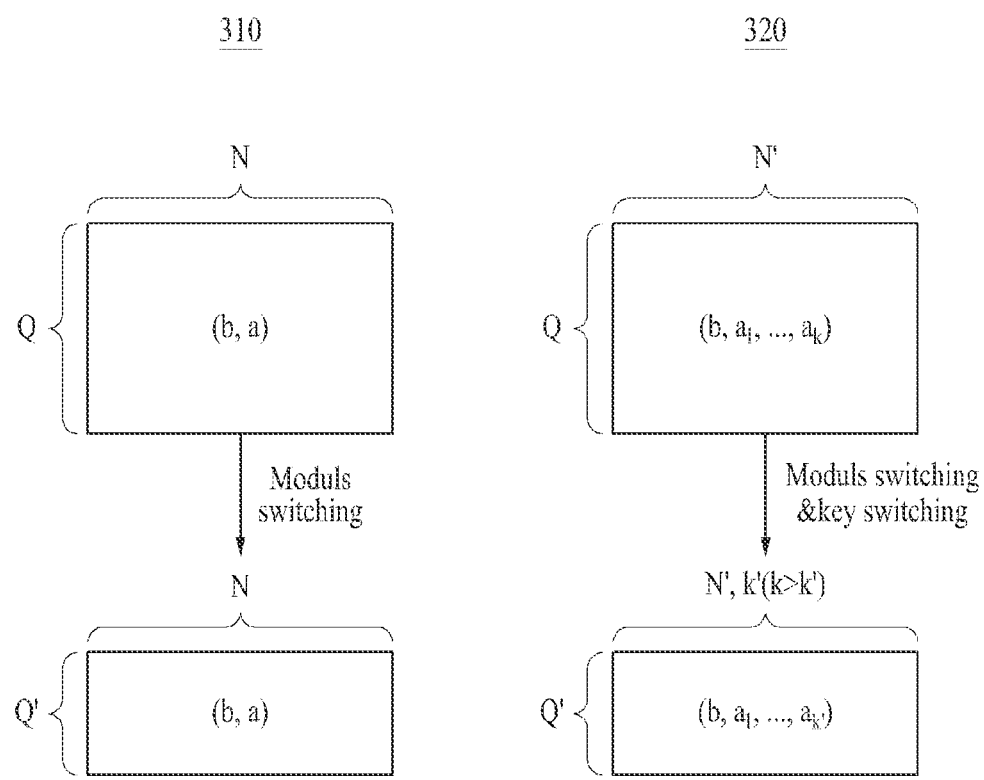
FIG. 3A illustrates an example of a method of performing an operation of decreasing a modulus.

FIG. 3A illustrates an example of a method of performing an operation of decreasing a modulus.

Referring to FIG. 3A, a diagram 310 illustrates an operation method of decreasing a modulus in a typical RLWE problem-based homomorphic encryption, and a diagram 320 illustrates an operation method of decreasing a modulus according to one or more embodiments.

When performing a homomorphic encryption operation, a modulus change operation may be performed. For example, when proceeding with the homomorphic encryption operation, the operable number of homomorphic operations may decrease. In this case, the operation of decreasing the modulus may increase the operable number of homomorphic operations.

Referring to the diagram 310, even when a modulus of RLWE problem-based ciphertext (b, a) including 2 N-degree polynomials is changed from Q to Q*, the size of the ciphertext may not be changed, and there may be no way to change the size of the ciphertext.

In contrast, referring to the diagram 320, a homomorphic encryption operation apparatus of one or more embodiments may provide a small throughput by decreasing the number k of modules according to the remaining operable number of homomorphic operations. For example, when a modulus of MLWE problem-based ciphertext (b, $a_1, \ldots a_k$) including k N'-degree polynomials is changed from Q to Q*, the homomorphic encryption operation apparatus may change the number of modules of the ciphertext from k to k*.

Figure 3B:
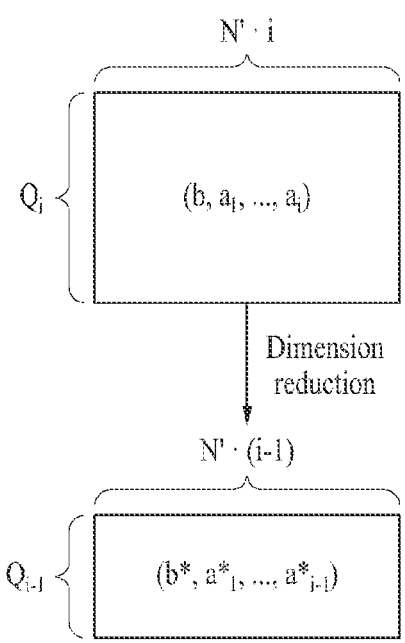
FIG. 3B illustrates an example of an operation of decreasing a number of modules.

FIG. 3B illustrates an example of an operation of decreasing a number of modules.

Referring to FIG. 3B, a homomorphic encryption operation apparatus may perform the operation of decreasing the number of modules when a modulus of ciphertext is changed to a value less than or equal to a predetermined value. For example, the homomorphic encryption operation apparatus may decrease the number of modules i to i−1 when a Q value, in response to a homomorphic encryption operation, becomes less than or equal to $Q_{i-1}$.

A security level may be inversely proportional to a modulus Q. For example, the security level may increase when the modulus Q decreases as the homomorphic encryption operation proceeds. In addition, the security level may be inversely proportional to the number i of modules. Accordingly, the homomorphic encryption operation apparatus of one or more embodiments may decrease the number i of modules as much as an increase of the security level as the modulus Q decreases as the homomorphic encryption operation proceeds, thereby performing an operation with small-sized ciphertext while maintaining safety.

When a security parameter value is (N,k,Q)=(N',i,$Q_i$),(N', i−1,$Q_{i-1}$) at the same security level, a secret key of ciphertext before a homomorphic operation may be sk=($s_1, s_2, \ldots, s_i$) in a process of decreasing the number i of modules, and a secret key of ciphertext after the homomorphic operation may be sk'=($s_1, s_2, \ldots, s_{i-1}$). In this case, MLWE ciphertext, of which the size in a ring dimension may decrease compared to a typical ciphertext having a secret key sk', may be obtained through a module rank reduction key MLWE'$_{sk}$($s_j$), and the speed of a ciphertext operation may further increase.

Figure 4A:
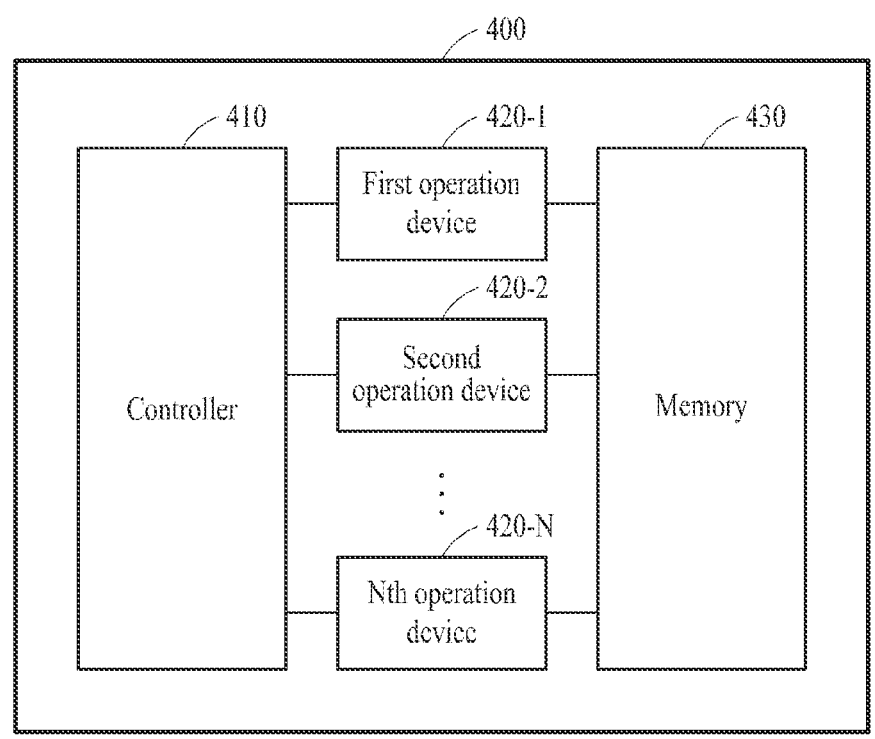
FIGS. 4A and 4B each illustrate an example of a homomorphic encryption operation apparatus.
Figure 4B:
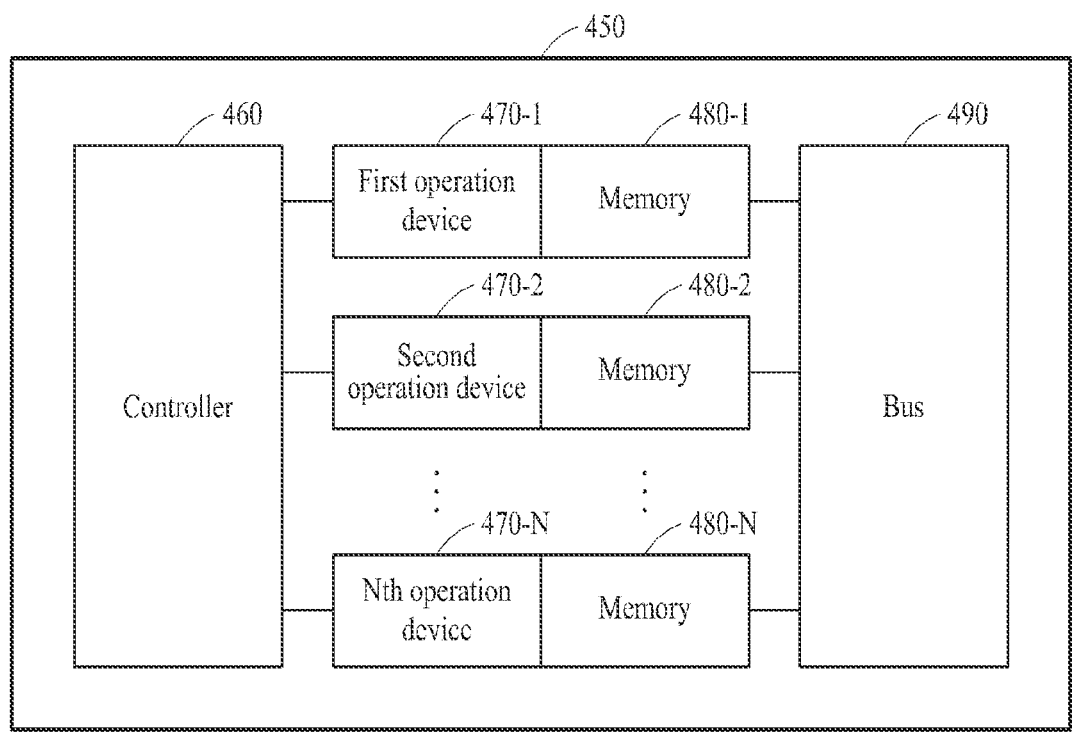

FIGS. 4A and 4B each illustrate an example of a homomorphic encryption operation apparatus.

Referring to FIG. 4A, a homomorphic encryption operation apparatus 400 may include a controller 410 (e.g., one or more controllers), a plurality of operation devices 420-1 to 420-N, and a memory 430 (e.g., one or more memories). The controller 410, the plurality of operation devices 420-1 to 420-N, and the memory 430 may communicate with one another through a bus, a network on a chip (NoC), a peripheral component interconnect express (PCIe), and/or the like.

Although the controller 410 and the memory 430 are each illustrated as being one in FIG. 4A for ease of description, this is only for the ease of description, and there may be two or more of them according to embodiments.

The controller 410 may receive one or more requests to process a homomorphic encryption operation in the plurality of operation devices 420-1 to 420-N and may generate a command executable in the plurality of operation devices 420-1 to 420-N in response to the requests. The controller 410 may be included in a host (e.g., a central processing unit (CPU)) or may be separate from the host. In an example, the controller 410 may be or include a processor (e.g., one or more processors). When separate from the host, the controller 410 may receive one or more jobs from the host to process the homomorphic encryption operation and may assign the jobs to the plurality of operation devices 420-1 to 420-N or may divide the received jobs into smaller jobs and assign the smaller jobs to the plurality of operation devices 420-1 to 420-N.

The controller 410 may schedule the homomorphic encryption operation based on ciphertext, based on at least one of a modulus of the ciphertext or a plurality of modules included by the ciphertext. The controller 410 may also be referred to as an accelerator controller, a scheduler, or the like. As an example which will be described in detail below, the controller may schedule the homomorphic encryption operation based on the plurality of modules included by the ciphertext. For example, the controller 410 may assign the homomorphic encryption operation corresponding to the plurality of modules included by the ciphertext according to the currently operable number of the plurality of operation devices 420-1 to 420-N. Alternatively, the controller 410 may schedule the homomorphic encryption operation based on the modulus of the ciphertext. For example, the controller 410 may assign the homomorphic encryption operation corresponding to the modulus of the ciphertext according to the currently operable number of the plurality of operation devices 420-1 to 420-N.

The memory 430 may be a memory outside the plurality of operation devices 420-1 to 420-N and may be, for example, a dynamic random-access memory (DRAM) that is used as a main memory of a homomorphic encryption operation apparatus. However, the memory may be implemented as a memory in various forms other than DRAM. For example, the memory 430 may be implemented as a volatile memory device or a non-volatile memory device, and the volatile memory device may be implemented as DRAM, static RAM (SRAM), thyristor RAM (T-RAM), zero capacitor RAM (Z-RAM), and/or twin transistor RAM (TTRAM). In an example, the memory 430 may be or include a non-transitory computer-readable storage medium storing instructions that, when executed by the controller 410, configure the controller 410 to perform any one, any combination, or all of operations and methods of the controller 410.

The non-volatile memory device may be implemented as an electrically erasable programmable read-only memory (EEPROM), a flash memory, a magnetic RAM (MRAM), a spin-transfer torque-MRAM (STT-MRAM), a conductive bridging RAM (CBRAM), a ferroelectric RAM (FeRAM), a phase change RAM (PRAM), a resistive RAM (RRAM), a nanotube RRAM, a polymer RAM (PoRAM), a nano-floating gate memory (NFGM), a holographic memory, a molecular electronic memory device, and/or an insulator resistance change memory.

The memory 430 may store an operation key including a re-linearization key and the ciphertext including the plurality of modules, and the stored operation key and ciphertext may later be transmitted to the plurality of operation devices 420-1 to 420-N for the homomorphic encryption operation.

The plurality of operation devices 420-1 to 420-N may be a device for performing the homomorphic encryption operation according to a command of the controller 410 and may be a separate processor different from the host. The plurality of operation devices 420-1 to 420-N may each or collectively be a hardware accelerator or an accelerator. For example, the plurality of operation devices 420-1 to 420-N may each or collectively be a neural processing unit (NPU), a graphics processing unit (GPU), a tensor processing unit (TPU), a digital signal processor (DSP), and/or the like.

The homomorphic encryption operation of the plurality of operation devices 420-1 to 420-N may be more efficiently processed in a separate, dedicated processor rather than a general host due to the characteristics of those operations.

Since ciphertext includes a plurality of modules in MLWE problem-based homomorphic encryption, unlike RLWE problem-based homomorphic encryption, the homomorphic encryption operation may be parallelly processed through the plurality of operation devices 420-1 to 420-N.

For example, the homomorphic encryption operation apparatus of one or more embodiments may parallelly process a key switching operation, which is one of the most expensive operations in a lattice-based homomorphic encryption structure, with respect to a small ring element through a module structure.

In addition, as described above, a value of dimension N of modules, which is a minimum operation unit, may be set as a smaller value in MLWE than in RLWE. Accordingly, since the dimension N of modules, which is the minimum operation unit, may be set as a small value, the homomorphic encryption operation apparatus of one or more embodiments may easily optimize the plurality of operation devices 420-1 to 420-N when implementing it as a field programmable gate array (FPGA) or an application-specific integrated circuit (ASIC) in terms of clock frequency, memory utilization, area optimization, or the like.

The plurality of operation devices 420-1 to 420-N may share the memory 430. Some pieces of data to be used for the homomorphic encryption operation assigned to each of the plurality of operation devices 420-1 to 420-N may be common. With the plurality of operation devices 420-1 to 420-N sharing such common pieces of data, the homomorphic encryption operation apparatus of one or more embodiments may increase systemwide operation efficiency.

Alternatively, each of the plurality of operation devices 420-1 to 420-N may have a memory component depending on embodiments. Referring to FIG. 4B, a homomorphic encryption operation apparatus 450 may include a controller 460 (e.g., one or more processors), a plurality of operation devices 470-1 to 470-N, and a plurality of memories 480-1 to 480-N. The plurality of operation devices 470-1 to 470-N may respectively include the plurality of memories 480-1 to 480-N. The plurality of memories 480-1 to 480-N may each be referred to as a memory component to distinguish from the memory 430.

Since the plurality of memories 480-1 to 480-N may store data to be used for a homomorphic encryption operation performed in the plurality of operation devices 470-1 to 470-N respectively corresponding to the plurality of memories 480-1 to 480-N, the memory size may decrease compared to the memory 430. However, during a parallel operation through the plurality of operation devices 470-1 to 470-N, data movement between the plurality of operation devices 470-1 to 470-N may be performed. For this, the homomorphic encryption operation apparatus 450 may additionally use a bus 490 for performing data transmission between the plurality of memories 480-1 to 480-N.

Figure 5A:
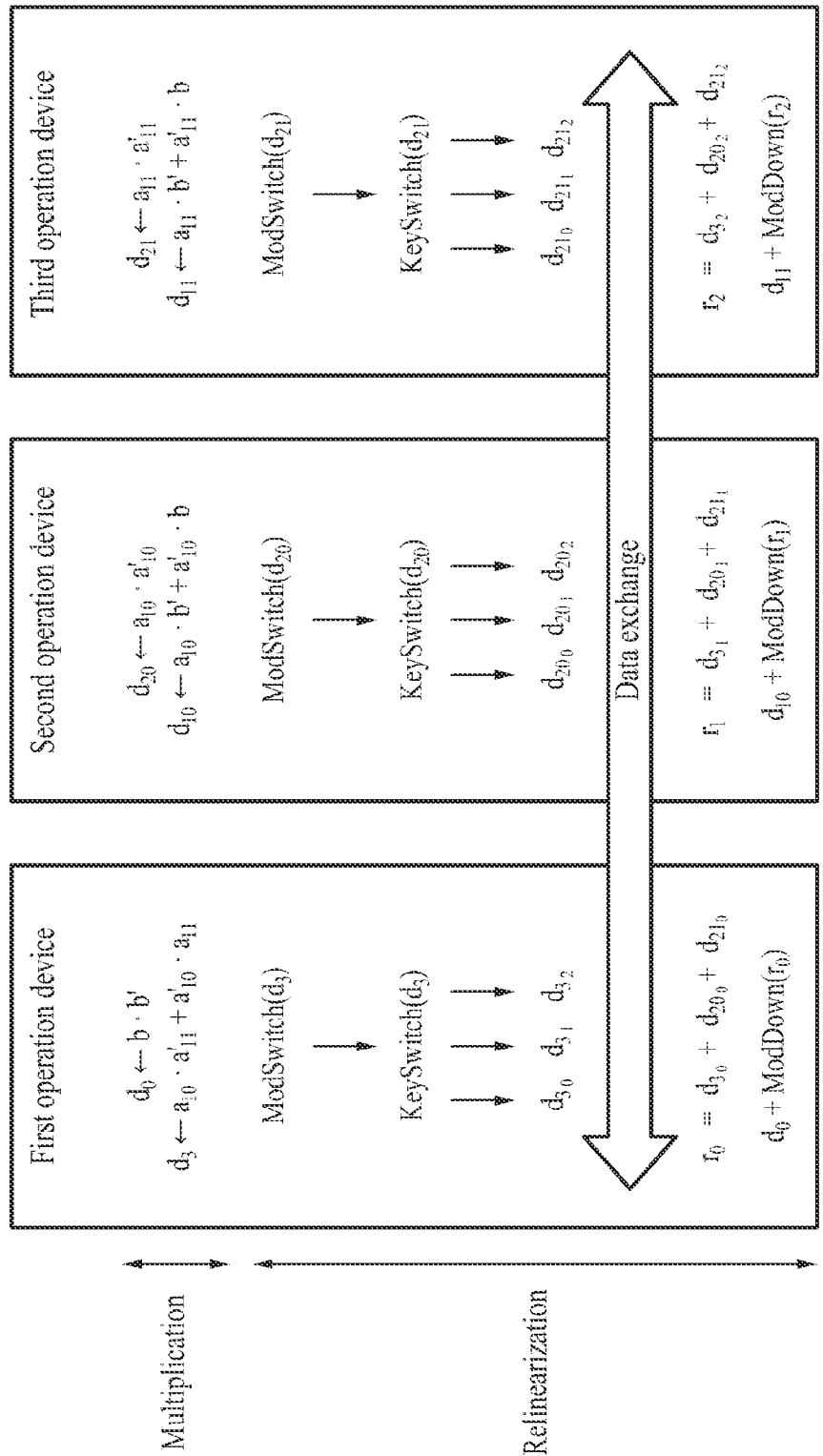
FIGS. 5A and 5B each illustrate an example of a method of performing a multiplication operation of ciphertext by using a homomorphic encryption operation apparatus.
Figure 5B:
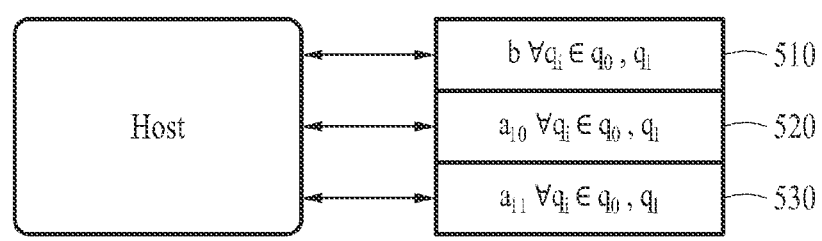

FIGS. 5A and 5B each illustrate an example of a method of performing a multiplication operation of ciphertext by using a homomorphic encryption operation apparatus.

It is assumed, for ease of description, that ciphertext m is (b, $a_1$), ciphertext m' is (b', $a'_1$), a dimension N of ciphertext is 2, a1 is a vector including a10 and a11, $a'_1$ is a vector including $a'_{10}$ and $a'_{11}$, and a modulus is $q_l$. Then, the ciphertext m may be expressed as $b + a_{10} \cdot s_{10} + a_{11} \cdot s_1$, and the ciphertext m' may be expressed as $b' + a'_{10} \cdot s'_{10} + a'_{11} \cdot s'_{11}$.

In this case, multiplication mm' of the two ciphertexts is expressed in Equation 4 below, for example.

$$mm' = (b + a_{10} \cdot s_{10} + a_{11} \cdot s_{11})(b' + a'_{10} \cdot s'_{10} + a'_{11} \cdot s'_{11}) \quad \text{Equation 4}$$

$$mm' = (b \cdot b') + (a_{10} \cdot b' + a'_{10} \cdot b)s_{10} + (a_{11} \cdot b' + a'_{11} \cdot b)s_{11} +$$

$$a_{10} \cdot a'_{10} \cdot s_{10}^2 + a_{11} \cdot a'_{11} \cdot s_{11}^2 + (a_{10} \cdot a'_{11} + a'_{10} \cdot a_{11})s_{10}s_{11}$$

In Equation 4, when (b·b') is defined as $d_0$, $(a_{10} \cdot b' + a'_{10} \cdot b)$ is defined as $d_{10}$, $(a_{11} \cdot b' + a'_{11} \cdot b)$ is defined as $d_{11}$, $a_{10} \cdot a'_{10}$ is defined as $d_{20}$, $a_{11} \cdot a'_{11}$ is defined as $d_{21}$, and $(a_{10} \cdot a'_{11} + a'_{10} \cdot a_{11})s_{10}s_{11}$ is defined as $d_3$, mm' may be expressed as Equation 5 below, for example.

$$mm' = d_0 + d_{10} \cdot s_{10} + d_{11} \cdot s_{11} + d_{20} \cdot s_{10}^2 + d_{21} \cdot s_{11}^2 + d_3 \cdot s_{10}s_{11} \quad \text{Equation 5}$$

In Equation 5, when $d_1$ is defined as a vector including $d_{10}$ and $d_{11}$, and $d_2$ is defined as a vector including $d_{20}$ and $d_{21}$, mm' may be expressed as Equation 6 below, for example.

$$mm' = d_0 + d_1 \cdot s_1 + d_2 \cdot s_1^2 + d_3 \cdot s_{10}s_{11} \quad \text{Equation 6}$$

Referring to FIG. 5B, when performing an mm' operation, which is the multiplication of the two ciphertexts, by using three operation devices 510 to 530, a controller may assign three operations on an equation of the first degree respectively to the three operation devices 510 to 530. For example, the controller may assign an operation on $d_0$ to a first operation device 510, an operation on $d_{10}$ to a second operation device 520, and an operation on $d_{11}$ to a third operation device 530.

In addition, the controller may assign three operations on an equation of the second degree having a high throughput respectively to the three operation devices 510 to 530. For example, the controller may assign an operation on $d_3$ to a first operation device 510, an operation on $d_{20}$ to a second operation device 520, and an operation on $d_{21}$ to a third operation device 530.

In this case, the first operation device 510 may use $a_{10}$ and $a'_{11}$ to perform the operation on $d_3$, the second operation device 520 may use b to perform the operation on $d_{20}$, and the third operation device 530 may use b to perform the operation on $d_{21}$.

When a homomorphic encryption operation apparatus 500 shares a memory (e.g., the memory 430 of FIG. 4A) as illustrated in FIG. 4A, data may be retrieved from the memory 430 and provided to each of the operation devices. However, when each operation device includes a memory component (e.g., the memories 480-1 to 480-N of FIG. 4B) as illustrated in FIG. 4B, and ciphertext data for performing an operation of each operation device is only stored in the memory component, data transmission through communication between the memory components may be additionally required for a homomorphic encryption operation.

For example, b,b' may be stored in a memory component corresponding to the first operation device 510, $a_{10}$ and $a'_{10}$ may be stored in the second operation device 520, and $a_{11}$ and $a'_{11}$ may be stored in the third operation device 530. The first operation device 510, to perform an operation on $d_3$, may receive $a_{10}$ from a memory component corresponding to the second operation device 520 and may receive $a'_{11}$, from a memory component corresponding to the third operation device 530, the second operation device 520, to perform an operation on $d_{20}$, may receive b from a memory component corresponding to the first operation device 510, and the third operation device 530, to perform an operation on $d_{21}$, may receive b from the memory component corresponding to the first operation device 510.

Referring to FIG. 5A again, when performing a multiplication operation on ciphertext, components (e.g., $d_2$ and $d_3$ of Equation 6) in which the degree of a secret key is greater than or equal to a second degree may be generated, and thus a re-linearization operation may be performed. For example, a re-linearization operation on Equation 6 may be expressed as Equation 7 below.

$$d'_0 + d'_1 \cdot s \approx d_0 + d_1 \cdot s_1 + d_2 \cdot s_1^2 + d_3 \cdot s_{10}s_{11} \quad \text{Equation 7}$$

The homomorphic encryption operation apparatus 500 may obtain linearized components $d_{20_0}$, $d_{20_1}$, $d_{20_2}$, $d_{21_0}$, $d_{21_1}$, $d_{22_2}$, $d_{3_0}$, $d_{3_1}$, and $d_{3_2}$ by receiving a re-linearization key stored in the memory and may perform a re-linearization operation based on the linearized components. For this, the homomorphic encryption operation apparatus 500 may additionally perform data transmission through communication between the memory components.

For example, the first operation device 510 may receive $d_{20_0}$ from the memory component corresponding to the second operation device 520 and $d_{21_0}$ from the memory component corresponding to the third operation device 530. The second operation device 520 may receive $d_{3_1}$ from the memory component corresponding to the first operation device 510 and $d_{21_1}$ from the memory component corresponding to the third operation device 530. Likewise, the third operation device 530 may receive $d_{3_2}$ from the memory component corresponding to the first operation device 510 and $d_{20_2}$ from the memory component corresponding to the second operation device 520.

Then, the first operation device 510 may perform a re-linearization operation based on $d_{3_0}$, $d_{20_0}$, and $d_{21_0}$, the second operation device 520 may perform a re-linearization operation based on $d_{3_1}$, $d_{20_1}$, and $d_{21_1}$, and the third operation device 530 may perform a re-linearization operation based on $d_{3_2}$, $d_{20_2}$, and $d_{21_2}$. When the re-linearization operation is completed, the homomorphic encryption operation apparatus 500 may transmit $d_3$, $d_{20}$, and $d_{21}$ respectively in b, $a_{10}$, and $a_{11}$ digits.

Although the example of performing multiplication of ciphertext, in which the number of modules of the ciphertext is 2 and the dimension of the ciphertext is two, through three operation devices is described with reference to FIGS. 5A and 5B for ease of description, the number of modules of ciphertext, the dimension of the ciphertext, and the number of operation devices are not limited to the foregoing example.

Figure 6A:
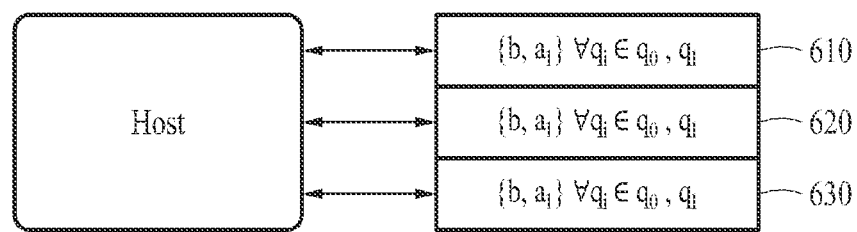
FIGS. 6A and 6B each illustrate an example of a method of performing a homomorphic encryption operation.
Figure 6B:
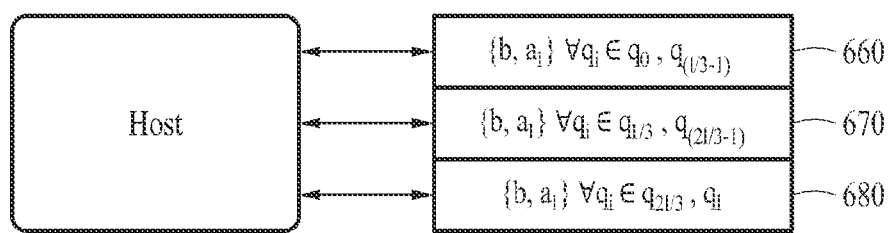

FIGS. 6A and 6B each illustrate an example of a method of performing a homomorphic encryption operation. The example of FIG. 5A is used for the description with reference to FIGS. 6A and 6B, and redundant descriptions may be omitted.

Referring to FIG. 6A, a controller of a homomorphic encryption operation apparatus 600 may assign an operation on b to a first operation device 610, an operation on $a_{10}$ to a second operation device 620, and an operation on $a_{11}$ to a third operation device 630. However, unlike FIG. 5B, memory components respectively corresponding to operation devices may store all ciphertext data. For example, a memory component corresponding to the first operation device 610 may store $a_{10}$ and $a_{11}$ other than b, and the second operation device 620 and the third operation device 630 may each store b, $a_{10}$, and $a_{11}$.

The homomorphic encryption operation apparatus 600 of one or more embodiments may not require communication between the first, second, and third operation devices 610 to 630 for a homomorphic multiplication operation, unlike the homomorphic encryption operation apparatus 500 of FIG. 5B. For example, the first operation device 610 may not require communication with memories respectively corresponding to other operation devices since the first operation device 610 already has $a_{10}$, and $a'_{11}$ in a memory corresponding to itself when performing the operation on $d_3$. In addition, when performing a re-linearization operation, the homomorphic encryption operation apparatus 600 of one or more embodiments may not require communication with the memories respectively corresponding to other operation devices. However, when the re-linearization operation is completed, the homomorphic encryption operation apparatus 600 may transmit $d_3$, $d_{20}$, and $d_{21}$ respectively in b, $a_{10}$, and $a_{11}$ digits.

Since the homomorphic encryption operation apparatus 600 of one or more embodiments does not require communication between the first, second, and third operation devices 610 to 630, the homomorphic encryption operation apparatus 600 of one or more embodiments may advantageously improve operation speed compared to a homomorphic encryption operation apparatus requiring such communication. However, a memory size may increase since a memory component may store an increased amount of ciphertext data.

Referring to FIG. 6B, a controller of a homomorphic encryption operation apparatus 650 (including operation devices 660, 670, and 680) may schedule a homomorphic encryption operation based on a modulus of ciphertext. For example, the controller of the homomorphic encryption operation apparatus 650 may assign an operation on ciphertext corresponding to a first modulus interval $$q_0 \sim q_{\frac{l}{3}-1}$$

to the first operation device 660, an operation on ciphertext corresponding to a second modulus interval $$q_{\frac{l}{3}} \sim q_{\frac{2l}{3}-1}$$

to the second operation device 670, an operation on ciphertext corresponding to a third modulus interval $$q_{\frac{2l}{3}} \sim q_l$$

to the third operation device 680.

Memory components respectively corresponding to operation devices may store ciphertext data corresponding to each modulus interval. Accordingly, a memory size of the homomorphic encryption operation apparatus 650 may use ⅓ the size of the memory of the homomorphic encryption operation apparatus 600. The homomorphic encryption operation apparatus 650 may additionally use data transmission through communication between memories for a re-linearization operation. When the re-linearization operation is completed, the homomorphic encryption operation apparatus 650 may transmit $d_3$, $d_{20}$, and $d_{21}$ respectively in b, $a_{10}$, and $a_{11}$ digits.

Although the example of performing multiplication of ciphertext, in which the number of modules of the ciphertext is 2, and the dimension of the ciphertext is two, through three operation devices is described with reference to FIGS. 6A and 6B for ease of description, the number of modules of ciphertext, the dimension of the ciphertext, and the number of operation devices are not limited to the foregoing example.

Figure 7:
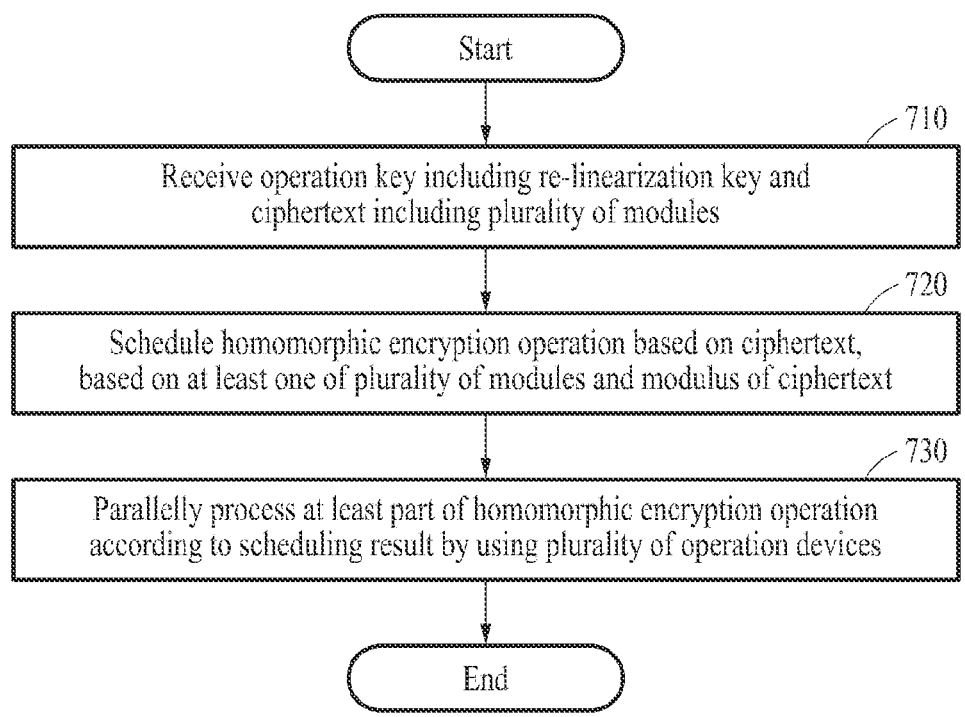
FIG. 7 illustrates an example of a homomorphic encryption operation method.

FIG. 7 illustrates an example of a homomorphic encryption operation method.

For ease of description, it will be described that operations 710 to 730 are performed by using the homomorphic encryption operation apparatus described with reference to FIG. 1. However, operations 710 and 730 may be performed by another suitable electronic device in a suitable system.

Furthermore, the operations of FIG. 7 may be performed in the shown order and manner. However, the order of some operations may be changed, or some operations may be omitted, without departing from the spirit and scope of the shown example. The operations illustrated in FIG. 7 may be performed in parallel or simultaneously.

Referring to FIG. 7, in operation 710, a homomorphic encryption operation apparatus according to an embodiment may receive an operation key including a re-linearization key and ciphertext including a plurality of modules.

In operation 720, the homomorphic encryption operation apparatus may schedule a homomorphic encryption operation based on the ciphertext, based on at least one of the plurality of modules and a modulus of the ciphertext.

In operation 730, the homomorphic encryption operation apparatus may parallelly process at least part of the homomorphic encryption operation according to a scheduling result by using a plurality of operation devices.

The homomorphic encryption operation apparatus may parallelly process a re-linearization operation by using the re-linearization key. The homomorphic encryption operation apparatus may schedule the homomorphic encryption operation based on the modulus of the ciphertext. The homomorphic encryption operation apparatus may parallelly process the homomorphic encryption operation according to the modulus of the ciphertext. The homomorphic encryption operation apparatus may schedule the homomorphic encryption operation based on the plurality of modules included by the ciphertext.

The homomorphic encryption operation systems, clients, servers, homomorphic encryption operation apparatuses, controllers, operation devices, memories, buses, homomorphic encryption operation system 100, client 110, server 120, homomorphic encryption operation apparatus 400, controller 410, operation devices 420-1 to 420-N, memory 430, homomorphic encryption operation apparatus 450, controller 460, operation devices 470-1 to 470-N, memories 480-1 to 480-N, bus 490, homomorphic encryption operation apparatus 500, operation devices 510 to 530, homomorphic encryption operation apparatus 600, operation devices 610 to 630, homomorphic encryption operation apparatus 650, operation devices 660, 670, and 680, and other apparatuses, devices, units, modules, and components disclosed and described herein with respect to FIGS. 1-7 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. An apparatus comprising:
one or more memories configured to store an operation key comprising a re-linearization key and ciphertext comprising a plurality of modules;
a controller configured to schedule a homomorphic encryption operation based on the ciphertext, based on at least one of the plurality of modules and a modulus of the ciphertext; and
a plurality of operation devices configured to parallelly process respective parts of the homomorphic encryption operation according to a result of the scheduling.

2. The apparatus of claim 1, wherein, for the parallelly processing, the plurality of operation devices is further configured to parallelly process a re-linearization operation using the re-linearization key.

3. The apparatus of claim 1, wherein, for the scheduling, the controller is further configured to schedule the homomorphic encryption operation based on the modulus of the ciphertext.

4. The apparatus of claim 1, wherein, for the parallelly processing, the plurality of operation devices is further configured to parallelly process the homomorphic encryption operation according to the modulus of the ciphertext.

5. The apparatus of claim 3, wherein, for the parallelly processing, the plurality of operation devices is further configured to perform a multiplication operation based on the ciphertext without communicating with one another.

6. The apparatus of claim 1, wherein, for the scheduling, the controller is further configured to schedule the homomorphic encryption operation based on a number of the plurality of modules comprised in the ciphertext.

7. The apparatus of claim 1, wherein, for the parallelly processing, the plurality of operation devices is further configured to parallelly process the homomorphic encryption operation according to the plurality of modules comprised in the ciphertext.

8. The apparatus of claim 1, wherein the plurality of operation devices is further configured to share the one or more memories.

9. The apparatus of claim 1, wherein the one or more memories comprises a plurality of memories configured to store ciphertext performable in each of a plurality of accelerator memories.

10. The apparatus of claim 9, further comprising a bus configured to perform data transmission between the plurality of memories.

11. A processor-implemented method comprising:
receiving an operation key comprising a re-linearization key and ciphertext comprising a plurality of modules;
scheduling a homomorphic encryption operation based on the ciphertext, based on a modulus of the ciphertext and one or more of the plurality of modules; and
parallelly processing at least part of the homomorphic encryption operation according to a scheduling result by using a plurality of operation devices.

12. The method of claim 11, wherein the parallelly processing comprises parallelly processing a re-linearization operation using the re-linearization key.

13. The method of claim 11, wherein the scheduling comprises scheduling the homomorphic encryption operation based on the modulus of the ciphertext.

14. The method of claim 11, wherein the parallelly processing further comprises parallelly processing the homomorphic encryption operation according to the modulus of the ciphertext.

15. The method of claim 13, wherein the parallelly processing further comprises performing a multiplication operation based on the ciphertext without communicating with one another.

16. The method of claim 11, wherein the scheduling further comprises scheduling the homomorphic encryption operation based on the plurality of modules comprised in the ciphertext.

17. The method of claim 11, wherein the parallelly processing further comprises parallelly processing the homomorphic encryption operation according to the plurality of modules comprised in the ciphertext.

18. A non-transitory computer-readable storage medium storing instructions that, when executed by one or more processors, configure the one or more processors to perform the homomorphic encryption operation method of claim 11.

19. An apparatus comprising:
one or more memories configured to store an operation key comprising a re-linearization key and ciphertext comprising a plurality of modules;
a controller configured to schedule a homomorphic encryption operation for the ciphertext, based on a number of the plurality of modules comprised in the ciphertext; and
a plurality of operation devices configured to parallelly process respective parts of the homomorphic encryption operation according to a result of the scheduling.

20. The apparatus of claim 19, wherein,
the one or more memories comprises a plurality of memories, each corresponding to a respective one of the operation devices, and
an operation device among the operation devices is configured to receive data from a memory of the memories corresponding to another operation device among the operation devices, and perform a respective part of the homomorphic encryption operation based on the received data.

* * * * *